May 13, 1969 A. R. PEARLMAN 3,444,362

ANTILOGARITHMIC FUNCTION GENERATOR

Filed Oct. 30, 1964 Sheet 1 of 2

INVENTOR.
ALAN R. PEARLMAN
BY
Robert J. Schiller
ATTORNEY

INVENTOR.
ALAN R. PEARLMAN
BY
Robert J. Schiller
ATTORNEY

United States Patent Office 3,444,362

Patented May 13, 1969

3,444,362

ANTILOGARITHMIC FUNCTION GENERATOR

Alan R. Pearlman, Newton Highlands, Mass., assignor, by mesne assignments, to Teledyne, Inc., Hawthorne, Calif., a corporation of Delaware Filed Oct. 30, 1964, Ser. No. 407,795
Int. Cl. G06g 7/26; H03k 19/08; H01l 11/00
U.S. Cl. 235—197 8 Claims

ABSTRACT OF THE DISCLOSURE

A device for generating antilogarithmic functions of an input voltage and having a pair of semiconductor devices with matched thermal responses, each semiconductor having a diode junction. A reference current source is connected to a first of the junctions and the latter is also connected so as to sum the input voltage with the voltage drop across the first junction. The second junction is connected to the first junction only through an isolating or buffering means so that the summed voltages are applied to the second junction without perturbation of the current from the reference source. An output signal is provided by conversion of the current through the second junction to a corresponding voltage.

This invention relates to analog function generators, and, more particularly to analog electrical devices for deriving an output signal which is an antilogarithmic function of an input signal.

In a number of semiconductor devices having diode junctions, such as planar silicon transistors for example, the forward current $I_D$ through the junction (assuming no reactive components) will exhibit generally the following well-known relationship:

$$(1) \qquad I_D = I_S\left(e^{\frac{qV_D}{kt}} - 1\right)$$

where $e$ is the natural logarithm base; $I_S$ is the bulk saturation current of the junction device and substantially a constant; $V_D$ is the voltage across the junction; and $Kt/q$ is a constant which is about .026 volt at 27° C.

Thus, Equation 1 can be simplified to read $$(2) \qquad \frac{I_D}{I_S} \approx \left(e^{\frac{V_D}{.026}} - 1\right) \approx \ln^{-1} V_D$$

for $V_D \gg .026$ or $$(3) \qquad V_D \approx a \log_{10} I_D$$

if $I_D$ is appreciably larger than $I_S$; $a$ being a compound logarithmic coefficient.

A plot of typical diode junction characteristics is shown in FIG. 1 indicating the exponential nature of the change in forward current with voltage. The reverse current (shown on the negative side of the origin) due to reverse voltage below breakdown level is minute and substantially constant at constant temperature. A number of similar curves are given for different temperatures noted and show the marked shift of the current-voltage function due to temperature change.

The relationship defined in Equation 3 of diode forward current to the junction voltage, when corrected for temperature can be expressed, at least over a limited temperature range, as $$(4) \qquad V_D \approx V_O + a \log_{10}\frac{I_D}{I_O} + b(T_A - T_O)$$

where $V_O = V_D$ measured at a given reference current $I_O$ and reference temperature $T_O$, $b$ is a temperature coefficient, and $T_A$ is the actual junction temperature.

In a typical silicon transistor, $b \approx 2$ mv./° C. at about 27° C. The relationship set forth in Equation 4 is restricted to values of $I_D$ appreciably larger than the value of $I_S$ which is very nearly the same as $I_{EBO}$ (emitter-to-base leakage current with collector open) for well-made silicon transistors.

Based upon the foregoing relationships, a principal object of the present invention is to provide a novel electrical circuit which is adapted to provide an output which is substantially a function of the antilogarithm of an input.

Another important object of the present invention is to provide such an electrical circuit which is temperature insensitive over a range of temperatures of about 25° C.±50° C.

Other important objects of the present invention are to provide such a circuit wherein the voltage output is a function of the antilogarithm of a variable voltage input; to provide an analog device for providing such a voltage output and comprising a pair of semiconductor devices each characterized in having a diode junction across which a voltage is a substantially linear function of the logarithm of the junction forward current; to provide such an analog device including means providing a constant voltage drop across one of the semiconductor devices, means for summing the voltage drop with an input voltage and for applying the summed voltages across the other of the semiconductor devices, and means for measuring the current through that other semiconductor device due to the application of the summed voltages; and to provide such an analog device including means for providing buffering between the semiconductor devices, and wherein the means for measuring current is a current-to-voltage conversion device.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 2:
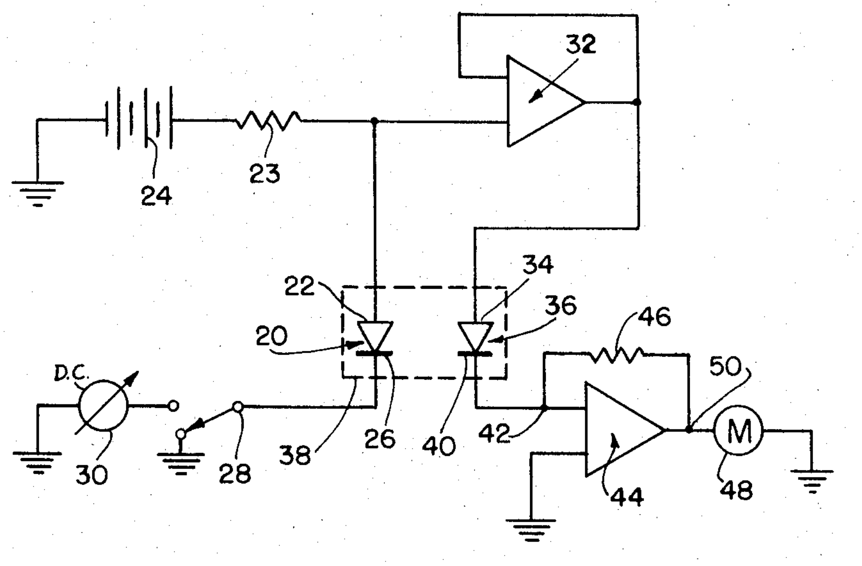
FIG. 2 is a schematic circuit diagram, illustrating one embodiment of the present invention.

Referring now to FIG. 2, there is shown a device for generating an antilogarithmic function of an input signal and comprising a first semiconductor device such as diode 20 having a diode junction of the type described by Equation 4. Means are provided for supplying a forward reference current $I_F$ of substantially constant magnitude to diode 20 and to this end one electrode, for example anode 22 of diode 20, is connected through high value resistor 23 to a large positive voltage available at a terminal of battery 24. The other terminal of the battery is grounded. Cathode 26 of diode 20 is connected to input terminal 28 which, by operation of a switch, is adapted to have either an input signal voltage $V_S$ applied thereto as from grounded variable voltage source 30, or to be connected directly to ground.

Anode 22 is also connected to a buffer or isolating means such as non-inverting unity gain voltage follower 32. The latter is shown as an operational amplifier having a simple feedback loop to provide substantially 100% feedback for unity gain. Because the input-impedance of the follower is, of course, extremely high there is substantially no appreciable input current, and, therefore, there is no material change in $I_F$. The output impedance of follower 32 is typically very low; thus the output voltage is relatively independent of the nature of the output load. The output terminal of follower 32 is connected to anode 34 of second diode 36.

Diodes 20 and 36 are preferably matched for electrical characteristics and are, as indicated by the broken line 38 embracing both diodes, disposed within the same thermal environment as by being mounted closely adjacent one another and in contact with a common heat sink.

Cathode 40 of diode 36 is connected to input terminal 42 of operational amplifier 44. The latter typically is an inverting amplifier having a high (e.g., 1,000 or more) open loop gain and also a negative feedback loop through feedback resistor 46 from the output of amplifier 44 to the summing point or input terminal 42. The output of amplifier 44 is connected to an indicating device or meter 48 intended to measure the output voltage. Operational amplifier 44 serves a number of purposes, particularly acting as a substantially zero-input impedance means for translating current through diode 36 to a voltage. Amplifier 44 functions to provide such voltage while operating as an isolating or buffering means such that current drive requirements of meter 48 cause substantially no perturbation in the current flowing through diode 36.

The operation of the foregoing embodiment can be described as follows: upon application of voltage $V_S$ at terminal 28 as by such closure of the switch as connects source 30 to terminal 28, a voltage $V_2$ is applied by follower 32 across diode 36. The voltage $V_2$ is the sum of the input voltage $V_S$ at terminal 28 and a voltage $V_1$ which is the voltage drop across diode 20 due to the constant current $I_F$ supplied by battery 24 and resistor 23.

(5) Thus, $$V_2=V_1+V_S$$

or $$V_S=V_2-V_1$$

Using Equation 4 to describe $V_1$ and $V_2$, (6) $V_1 \approx V_{01}+a_1 (\log I_1 - \log I_{01'})+b_1(T_{A1}-T_{01})$ and (7) $V_2 \approx V_{02}+a_2 (\log I_2 - \log I_{02})+b_2(T_{A2}-T_{02})$ where $I_1$ and $I_2$ are respectively the total currents flowing through diodes 20 and 36.

Because the diodes are matched and are in the same thermal environment, by definition $a_1=a_2=a$, $b_1=b_2=b$, $T_{A1}=T_{A2}$, $T_{01}=T_{02}$, $V_{01}=V_{02}$, and $I_{01}=I_{02}$.

Thus in accordance with Equation 5

(8) $$V_S \approx a (\log I_2 - \log I_1)$$

(9) $$\frac{I_2}{I_1} \approx 10^{\left(\frac{V_s}{a}\right)}$$

Characteristically, terminal 42 is maintained at a virtual ground by negative feedback. Hence current $I_2$, flowing through diode 36 and injected into terminal 42, will be matched by a current flowing through feedback resistor 46. If $R_f$ is the value of resistor 46 then voltage $-V_0$ at output terminal 50 of operational amplifier 44 is $I_2R_f$. Thus,

(10) $$-V_0=I_1R_f \cdot 10(V_s/a)$$

or, because both $I_1$ and $R_f$ are constant,

(11) $$-V_0=K \text{ antilog } (V_s/a)$$

Amplifier 44 will act to keep $-V_0$ at a value unaffected by loading imposed by indicating device 48 and so acts as a current-to-voltage buffer.

Figure 3:
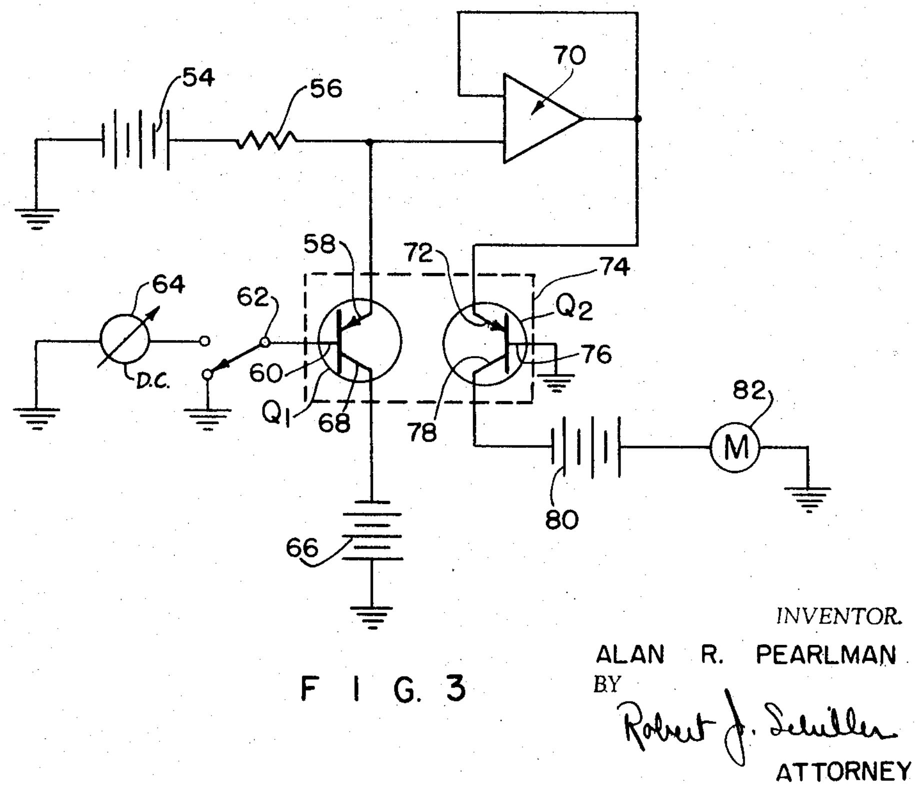
FIG. 3 is a schematic circuit diagram of yet another embodiment of the present invention.

Referring now to FIG. 3 there is shown another embodiment of the present invention comprising transistors $Q_1$ and $Q_2$ as semiconductor devices having emitter to base junctions with voltage-current characteristics similar to diode junctions generally of the type described by Equation 4. A source of substantially constant emitter current is provided in the form of battery 54, one terminal of which is grounded, the other terminal being connected through resistor 56 to emitter 58 of transistor $Q_1$. Base 60 of transistor $Q_1$ is connected to input terminal 62 which in turn is connectable through a switch either to ground or to source 64 of variable signals $V_s$. Supply voltage $V_{cc}$ for transistor $Q_1$ is provided, for example from battery 66 connected to collector 68.

Emitter 58 is connected to the input of voltage follower 70, the latter being characterized as hereinbefore described in connection with follower 32. The output of the voltage follower is connected to emitter 72 of transistor $Q_2$. The latter is, as indicated by the broken line box 74, disposed to be subject to the same thermal environment as transistor $Q_1$. Base 76 of transistor $Q_2$ is shown as grounded, the collector 78 of transistor $Q_2$ being connected to the appropriate terminal of a power source such as battery 80. The other terminal of battery 80 is connected to a load such as indicating device or ammeter 82. Transistors $Q_1$ and $Q_2$ are preferably matched to show, with respect to their base-emitter junctions, substantially similar electrical characteristics over the temperature range expected in the thermal environment.

Transistors have certain advantages over diodes for the purposes of the present invention. For example, the use of a transistor $Q_1$ as the diode junction device to which the input signal $V_s$ is applied provides a higher input impedance than is available with the diode circuit of FIG. 2. In the event of an error-producing resistance present in the lead from source 64, the higher input impedance reduces the input current and therefore the magnitude of error. The base and collector of transistor $Q_2$ can be connected directly to one another so that the transistor effectively is only a diode, but the grounded base configuration shown in FIG. 3 is preferred because it provides a higher output impedance than a comparable diode. This allows the transistor to drive a high impedance load without the need of an isolating amplifier. It is preferred that transistors $Q_1$ and $Q_2$ be high gain (e.g. 100 or greater) transistors in order to achieve 1% or better accuracy.

In operation, when voltage $V_s$ is applied to terminal 62, the emitter voltage of transistor $Q_1$ is at a level with respect to ground which is the sum of the input voltage $V_s$ and the base-emitter voltage $V_{EB1}$ due to the constant emitter current $I_F$ provided by battery by battery 54 and resistor 56. In a sense then, transistor $Q_1$ operates as an emitter-follower with a reference voltage added to the normal emitter voltage.

Thus, the voltage $V_{EB2}$ across the diode junction of transistor $Q_2$ is as follows:

(12) $$V_{EB2}=V_S+V_{EB1}$$

Defining $V_{EB2}$ and $V_{EB1}$ by appropriate forms of Equations 6 and 7, it can be shown that an equation similar to Equation 11 (in which $-V_0$ is replaced by $I_{C2}$) holds for the operation of the embodiment of FIG. 3. If the gain of transistors $Q_2$ is high (e.g. above 100) then the collector current $I_{C2}$ of that transistor approaches the same value as $I_2$, and $I_{C2}$ can drive the load imposed by meter 82 without perturbing $I_2$.

Alternatively, if it is desired to provide an output voltage rather than an output current to drive a load such as meter 82, an operational amplifier such as amplifier 44 can be provided in the circuit of FIG. 3 with its summing junction connected to battery 80 and its output connected to meter 82. The latter in this instance would be a voltmeter.

Figure 1:
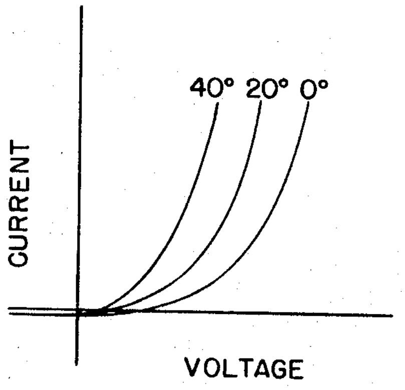
FIG. 1 is a plot of idealized current-voltage relationships of an exemplary semiconductor diode junction for several selected temperatures.
Figure 4:
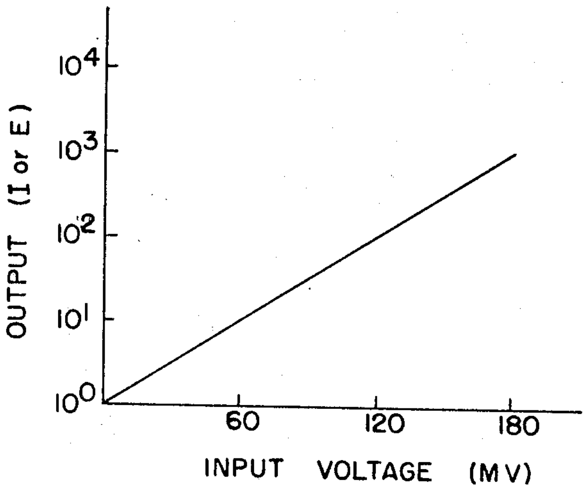
FIG. 4 is an illustrative semi-logarithmic plot of the relation of input signals to output signals in an operation of the embodiment of FIG. 2.

As will be seen in FIG. 4, for a range of input voltages $V_S$, the output signal measured is an antilogarithmic function of $V_S$ for both embodiments shown. Obviously, the principle of duality permits the use of npn transistors in the embodiment of FIG. 3 as well as the pnp transistors shown.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An analog device for generating an antilogarithmic function of an input voltage, said device comprising in combination;
  first and second diode junctions;
  means connected for supplying a constant forward reference current through said first junction;
  means connected for summing said input voltage with the voltage drop across said first junction due to said reference current;
  means connected for applying the summed voltages to said second junction so as to provide a forward current through the latter without substantially perturbing said reference current; and
  means connected for measuring the forward current through said second junction.

2. An analog device for generating an antilogarithmic function of an input voltage, said device comprising in combination;
  first and second diode junctions;
  means connected for supplying a constant forward reference current through said first junction;
  means connected for summing said input voltage with the voltage drop across said first junction due to said reference current;
  means connected for applying the summed voltages to said second junction so as to provide a forward current through the latter without substantially perturbing said reference current; and
  means connected for providing an output signal linearly related to the forward current through said second junction.

3. An analog device for generating an antilogarithmic function of an input voltage, said device comprising in combination;
  first and second semiconductor elements each having a diode junction with operating characteristics such that during forward conduction through said junction the current passed is substantially an exponential function of the voltage across said junction;
  means connected for supplying a forward reference current of substantially constant magnitude through said first element;
  means connected for summing said input voltage with the voltage drop across said first element due to said reference current;
  means connected for applying the summed voltages to said second element so as to provide a forward current through the latter without substantially perturbing said reference current; and
  means providing a voltage output linearly related to the forward current through the second element.

4. An analog device as defined in claim 3 wherein both of said elements are matched to exhibit electrically substantially the same thermal response and including means for subjecting said elements to substantially the same thermal environment simultaneously.

5. An analog device as defined in claim 3 wherein said elements are diodes.

6. An analog device as defined in claim 3 wherein said elements are transistors.

7. An analog device for generating an antilogarithmic function of an input voltage, said device comprising in combination;
  first and second semiconductor diodes matched to have substantially the same thermal response and being mounted on a common heat sink;
  a substantially constant forward current source connected to said first diode;
  means for applying said input voltage to said first diode so as to sum said input voltage with the voltage drop across said first diode due to forward current from said source;
  buffer means connected between said diodes so that the sum of the voltages can be applied to said second diode to create a forward current therethrough without substantially perturbing the current from said source; and
  an operaional amplifier having its input summing junction connected to said second diode for providing a voltage output linearly related to the forward current through said second diode.

8. An analog device for generating an antilogarithmic function of an input voltage, said device comprising in combination;
  first and second transistors matched to have substantially the same thermal response and being mounted on a common heat sink;
  said first transistor being in substantially emitter-follower configuration wherein the base thereof is adapted to have said input voltage applied thereto;
  a source of substantially constant forward current connected in the emitter-collector circuit of said first transistor so that said input voltage and the voltage drop through said first transistor due to said forward current are summed at a point in said emitter-collector circuit;
  a buffering voltage follower providing the sole connection between said point and the emitter of said second transistor;
  means providing forward collector-emitter bias across said second transistor; and
  means for measuring a signal proportional to the forward current through said second transistor due to the summed voltages and means providing said bias.

References Cited

UNITED STATES PATENTS

| | | | |
|---|---|---|---|
| 3,126,488 | 3/1964 | Johnson | 307—317 X |
| 3,188,576 | 6/1965 | Lewis | 330—23 |
| 3,197,627 | 7/1965 | Lewis | 235—197 |
| 3,206,619 | 9/1965 | Lin | 307—88.5 |
| 3,293,450 | 12/1966 | Gibbons | 307—88.5 |
| 3,308,271 | 3/1967 | Hilbiber | 219—501 |

MALCOLM A. MORRISON, *Primary Examiner.*

FELIX D. GRUBER, *Assistant Examiner.*

U.S. Cl. X.R.

328—145; 307—229, 310, 317; 219—501; 317—235